United States Patent

Morovic et al.

(10) Patent No.: US 9,754,194 B2
(45) Date of Patent: Sep. 5, 2017

(54) CALIBRATION TARGET

(71) Applicant: Hewlett-Packard Development Company, L.P., Houston, TX (US)

(72) Inventors: Peter Morovic, Sant Cugat del Valles (ES); Jan Morovic, Colchester (GB); Montserrat Solano Pallarol, Sant Cugat del Valles (ES); Marti Rius Rossell, Sant Cugat del Valles (ES); Juan Manuel Garcia Reyero Vinas, Sant Cugat del Valles (ES)

(73) Assignee: HEWLETT-PACKARD DEVELOPMENT COMPANY, L.P., Houston, TX (US)

( * ) Notice: Subject to any disclaimer, the term of this patent is extended or adjusted under 35 U.S.C. 154(b) by 0 days.

(21) Appl. No.: 15/294,759

(22) Filed: Oct. 16, 2016

(65) Prior Publication Data

US 2017/0032225 A1 Feb. 2, 2017

Related U.S. Application Data

(63) Continuation of application No. 14/787,409, filed as application No. PCT/US2013/051577 on Jul. 23, 2013, now Pat. No. 9,519,848.

(51) Int. Cl.
*B41J 2/21* (2006.01)
*B41J 29/393* (2006.01)
*G06K 15/02* (2006.01)
*H04N 1/60* (2006.01)
*B41J 29/38* (2006.01)
*G06F 3/12* (2006.01)

(52) U.S. Cl.
CPC .......... *G06K 15/027* (2013.01); *B41J 2/2146* (2013.01); *B41J 29/38* (2013.01); *B41J 29/393* (2013.01); *G06F 3/12* (2013.01); *H04N 1/605* (2013.01); *H04N 1/6008* (2013.01); *H04N 1/6038* (2013.01); *G06K 2215/0094* (2013.01); *G06K 2215/101* (2013.01)

(58) Field of Classification Search
CPC ........ B41J 2/2146; B41J 29/38; B41J 29/393; H04N 1/6008; H04N 1/605; H04N 1/6038; G06F 3/12; G06K 15/027; G06K 2215/0094; G06K 15/101
See application file for complete search history.

(56) References Cited

U.S. PATENT DOCUMENTS

| | | | | |
|---|---|---|---|---|
| 7,278,699 B2* | 10/2007 | Drake | ..................... | B41J 2/2146 347/12 |
| 7,571,974 B2* | 8/2009 | Cowan | .................. | H04N 1/6033 347/19 |
| 8,882,229 B2* | 11/2014 | Wu | ....................... | B41J 13/0027 347/104 |
| 9,427,970 B2* | 8/2016 | Cessel | ........................ | B41J 2/15 |

* cited by examiner

*Primary Examiner* — Anh T. N. Vo
(74) *Attorney, Agent, or Firm* — HP Inc.—Patent Department

(57) ABSTRACT

A calibration target is disclosed. The calibration target is created such that a color patch is sensitive to drop weight changes based on drop weight variations that show greater changes in color for a given change in drop weight.

20 Claims, 6 Drawing Sheets

CALIBRATION TARGET

RELATED APPLICATIONS

This application is a continuation of U.S. application Ser. No. 14/787,409, filed Oct. 27, 2015, now U.S. Pat. No. 9,519,848, which is a National Stage Application of International Application No. PCT/US2013/051577, filed Jul. 23, 2013. Each patent application identified above is incorporated herein by reference in its entirety to provide continuity of disclosure.

BACKGROUND

Most printers can be calibrated as a way to keep consistent color quality through changing conditions. The changing conditions may include changes in environmental conditions such as temperature and humidity changes. The changing conditions may also include wear of the printer over time. The printer typically calibrates by printing a number of patches of known colors to form a calibration target. The colors in the printed patches are then measured and the measured values are compared to the expected or known color values for each patch. The differences between the measured values and the known values are used to adjust or calibrate the printer.

DETAILED DESCRIPTION

Figure 1:
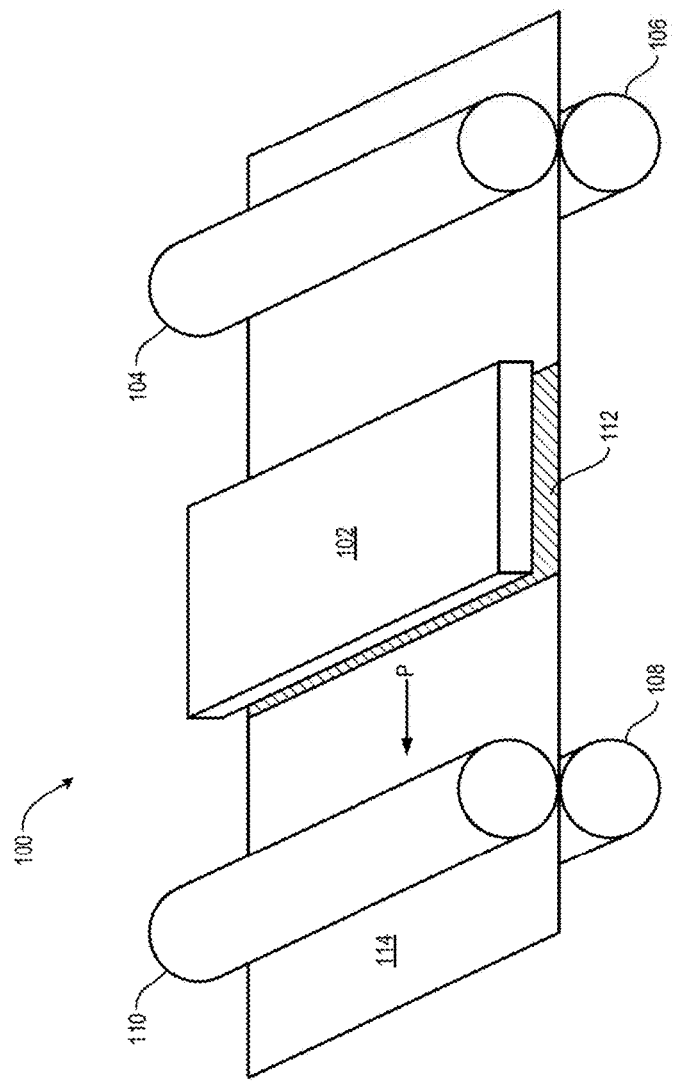
FIG. 1 is a schematic side view of an example PWA printer 100.

Printers can be calibrated by printing a calibration target onto media. A calibration target is any set of patches of known colors used to measure the color or grayscale performance of a printer. Colors on a calibration target can include shades of gray. Once the calibration target is printed, the colors in the printed patches are measured and the measured values are compared to the expected or known color values for each patch. The differences between the measured values and the known values are used to adjust or calibrate the printer.

The calibration accuracy required for printers is increasing. One reason for this increase in required accuracy is the increased use of multiple dies in the printheads of some printers. For example, a page wide array (PWA) printer has a number of overlapping dies that span the entire width of the page. Each die is used to print one segment of the page as the page is being fed through the printer. Color variations between dies in a PWA printer are more visible to the user because the images printed by each die are side-by-side down the length of the page. Because of the increased visibility of the color variations, the printers need to be calibrated to a tighter tolerance.

Color variations between dies can be caused by a number of factors. One of the main factors that can cause color variations is a change in the amount of ink ejected for each drop. The amount of ink in a drop is typically called the drop weight. The drop weight can change due to a number of factors, for example changes in the temperature of the die, changes in humidity and wear of the die over time. Unfortunately the accuracy available in the sensors typically used for calibrating printers is not high enough to measure a calibration target printed by a printer within the accuracy needed.

In addition, accurately measuring small color differences (around 0.5 dE) is significantly more difficult than measuring larger color differences (2 dE or greater). The International Commission on Illumination (CIE) has a measure of the difference between two colors called $\Delta E^*_{ab}$ (also called $\Delta E^*$, dE$^*$, dE, or "Delta E"). The formula used to calculate dE has been updated over time. In this application when referring to color differences or dE measurements, the formula published by CIE in 2000 will be assumed. One problem with measuring small color differences is the Signal to Noise ratio and another one is the fact that CIE DEs are designed around the 1 dE threshold (a just noticeable difference), values below this are not as well predicted.

There are generally two types of patches used in calibration targets. The first type of patch is a patch created using only one color of ink. A set of patches is printed where the density or amount of the single color of ink is varied between each patch in each set. A set of patches would be printed for each color of ink used by the printer. These types of patches are known as density ramps and are used in 1D calibration techniques. Changes in drop weight change the density or saturation in these types of patches but changes in drop weight do not change the color or hue of the patch because only one color of ink is used for each patch.

For a 3D calibration technique an array of differently colored patches are printed with the different colors distributed uniformly across the color space or gamut of the printer. In the 3D calibration technique, most of the patches are created using two or more colors of ink. Most colors in the array of patches can be created using more than one combination of ink (as described below).

Patches having the same color but created with different sets or combinations of ink have different sensitivity to variations in drop weight. In one example embodiment of the invention, the component inks used to create the colors for a calibration target will be selected to maximize the color change for a given change in the drop weight of one or more of the ink components.

FIG. 1 is a schematic side view of an example PWA printer 100. Printer 100 comprises a print bar 102, a pair of linefeed pinch rollers (104 and 106) and a pair of take-up pinch rollers (108 and 110). The drawing is for illustration purposes only and is not to scale. The pair of linefeed pinch rollers (104 and 106) and the pair of take-up pinch rollers (108 and 110) make up a media feeding system in this example. A media feeding system is any set of parts that direct media into and through a print zone. A print zone is defined as the area under the print bar 102 where ink is deposited onto the media. The linefeed pinch rollers (102 and 104) feed paper into a print zone shown as area 112. As the paper is fed past the print zone 112 the pair of take-up pinch rollers (108 and 110) capture the leading edge of the paper.

Once the leading edge of the paper reaches the take-up pinch rollers (108 and 110) the actions of the linefeed pinch rollers (104 and 106) can be coordinated with the actions of the take-up pinch rollers (108 and 110) to put tension along the length of the page in the print zone 112. A page 114 is shown loaded in the paper path between the linefeed pinch rollers and the take-up pinch rollers. The paper feeding direction is along the length of the page and is shown by arrow P.

Figure 2:
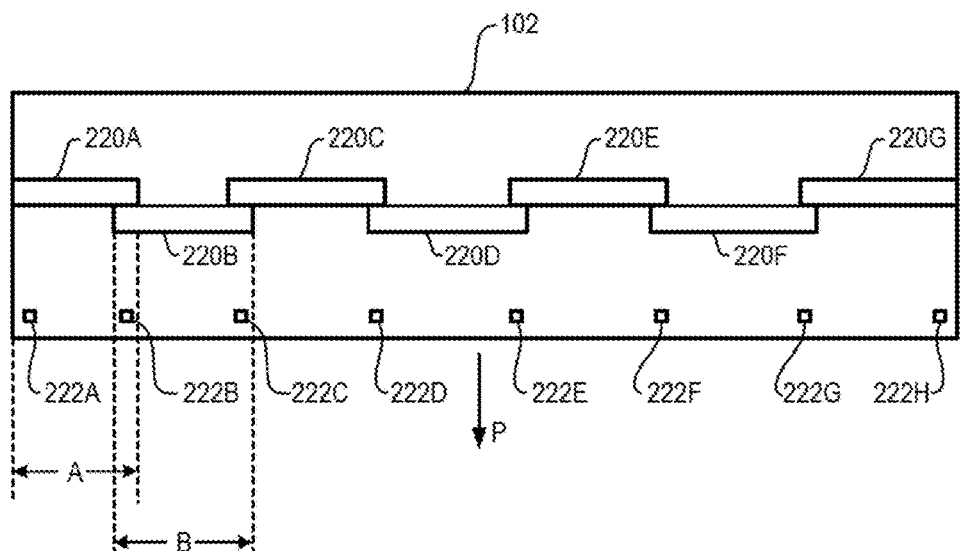
FIG. 2 is a bottom view of an example print bar 102.

FIG. 2 is a bottom view of an example print bar 102. Print bar 102 has a plurality of dies (220A-220G) mounted on the underside of print bar 102. The plurality of dies are overlapped or staggered in a line along the length of print bar 102. When the print bar 102 is installed in a printer, the plurality of dies form a continuous line across the width of the media in the print zone 112 (i.e. a page wide array). As the media is moved in the printing direction (as shown by arrow P) each die can print a segment of the media as it passes through the print zone 112.

Print bar 102 also has a plurality of sensors 222A-222H mounted in the bottom of the print bar 102. Each sensor is positioned such that it can detect images printed onto the media by one end of one of the dies (220A-220G). For example, the segment of media that can be printed on by die 220A is shown as segment A. The segment of media that can be printed on by die 220B is shown as segment B. Sensor 222A can detect ink deposited by the left side of die 220A. Sensor 222B can detect ink deposited by the right side of die 220A. In addition sensor 222B can detect ink deposited by the left side of die 220B. Using this arrangement, the ink deposited by each end of each die can be measured. In other examples one or more sensors are mounted to a carriage that can travel along the print bar (perpendicular to direction P). The sensors mounted in the carriage may be used to measure the ink deposited by each die (220A-220G) or each end of each die (220A-220G).

Figure 3:
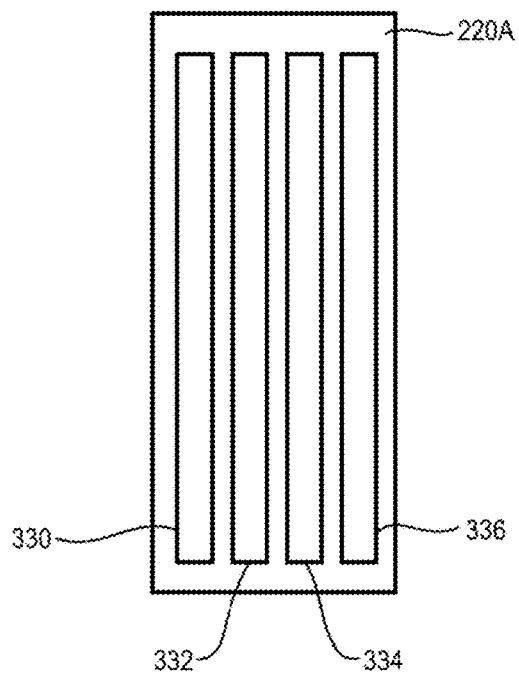
FIG. 3 is a bottom view of an example die 220A.

Each die (220A-220G) has multiple rows of nozzles running down the length of the die. The rows of nozzles are divided into sets, where each set contains multiple rows. Each set is used to print one color of ink. When the printer uses four colors of ink, for example cyan, yellow, magenta and black (CYMK), the die would have four sets of rows. With this configuration each die can print one or more colors of ink onto any part of the segment of media that is passing underneath the die. Ink is defined broadly as any printing fluid, for example ink, varnishes, pre-treatments and the like. FIG. 3 is a bottom view of an example die 220A. Die 220A has 4 sets of multiple rows of nozzles (330-336). Each set of rows is used to print one color of ink. For printers that use more than 4 colors of ink there would be a corresponding additional set of rows for each additional color of ink. For example a printer that used 8 colors of ink (cyan, light cyan, yellow, light yellow, magenta, light magenta, grey and black) would have 8 sets of rows.

Figure 4:
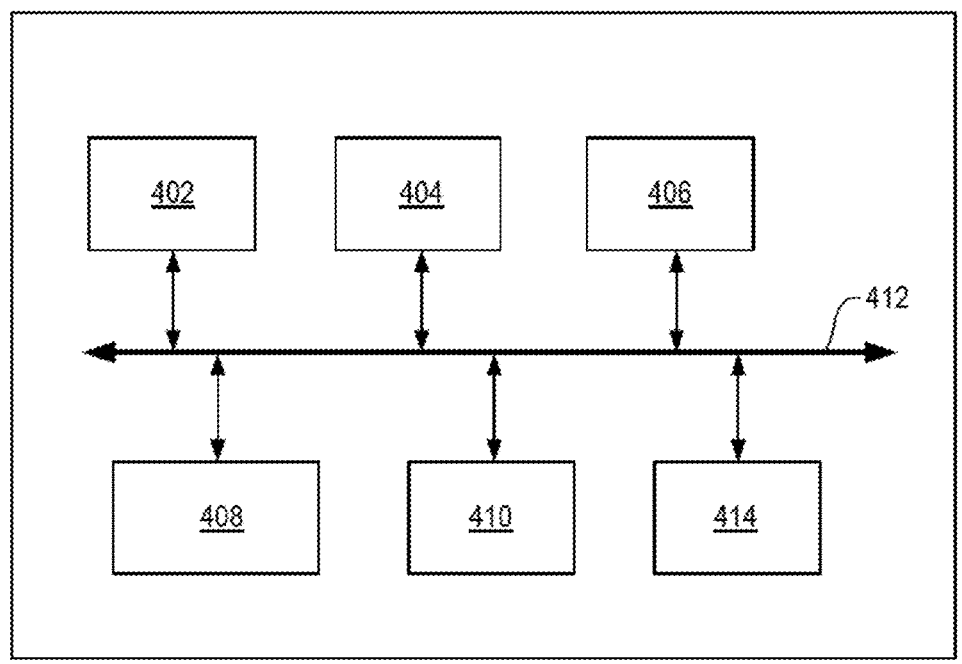
FIG. 4 is an example block diagram of a printer.

FIG. 4 is an example block diagram of a printer. Printer comprises a processor 402, memory 404, input/output (I/O) module 406, print engine 408 and controller 410 all coupled together on bus 412. In some examples printer may also have a user interface module, an input device, and the like, but these items are not shown for clarity. Processor 402 may comprise a central processing unit (CPU), a micro-processor, an application specific integrated circuit (ASIC), or a combination of these devices. Memory 404 may comprise volatile memory, non-volatile memory, and a storage device. Memory 404 is a non-transitory computer readable medium. Examples of non-volatile memory include, but are not limited to, electrically erasable programmable read only memory (EEPROM) and read only memory (ROM). Examples of volatile memory include, but are not limited to, static random access memory (SRAM), and dynamic random access memory (DRAM). Examples of storage devices include, but are not limited to, hard disk drives, compact disc drives, digital versatile disc drives, optical drives, and flash memory devices.

I/O module 406 is used to couple printer to other devices, for example the Internet or a computer. Printer has code, typically called firmware, stored in the memory 404. The firmware is stored as computer readable instructions in the non-transitory computer readable medium (i.e. the memory 404). Processor 402 generally retrieves and executes the instructions stored in the non-transitory computer-readable medium to operate the printer and to execute functions. In one example, processor executes code that calibrates the printer. The first step in calibrating the printer is printing a calibration target.

Figure 5:
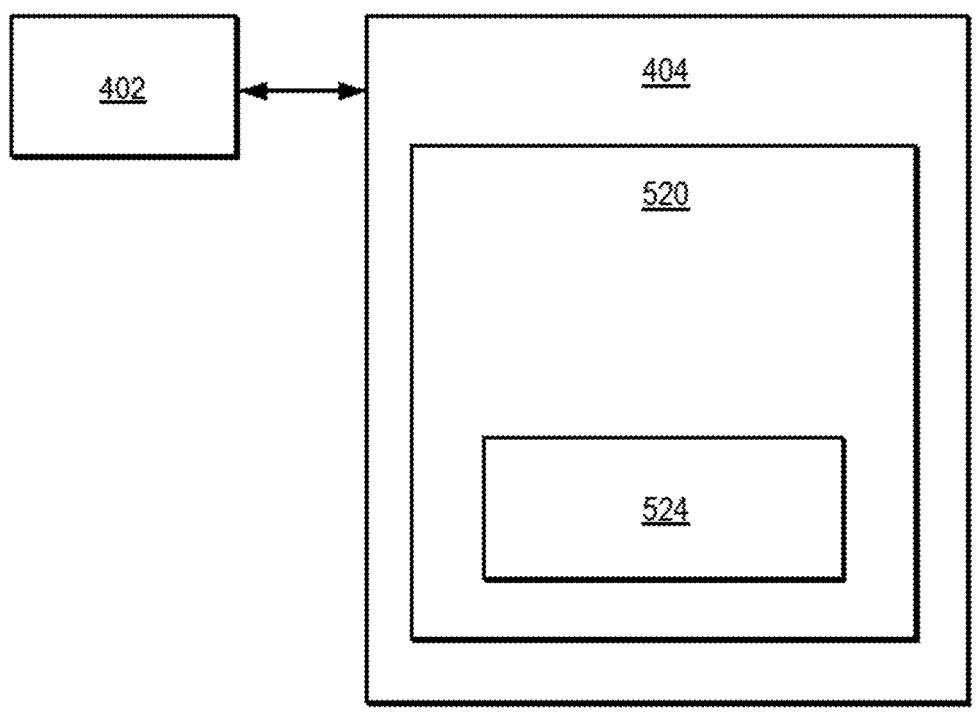
FIG. 5 is an example block diagram of the processor 402 coupled to memory 404.

FIG. 5 is an example block diagram of the processor 402 coupled to memory 404. Memory 404 contains software 520 (also known as firmware). Software 520 contains a calibration module 524. The processor 402 executes the code in calibration module 524 to calibrate the printer. A calibration target is printed as the first step in calibrating the printer.

The calibration target has a number of patches of known colors. For a printer using four different colors of ink (for example CYMK), the target would typically have between 64 and 125 different known colors. Each color in the target is selected such that it will be created using two or more differently colored printer inks. In some examples the printer will have 4 different ink colors, typically cyan, magenta, yellow and black (CYMK) ink. In other examples the printer may have more than four colors of ink, for example eight colors (cyan, light cyan, magenta, light magenta, yellow, light yellow, black and light gray).

The colors for the calibration target can be selected in a number of different ways. One way of selecting the different colors for the calibration target is selecting colors that are evenly spaced across the color space or gamut of the printer or evenly spaced across a different color space. Other methods of selecting the different colors may include centering the colors on flesh tones. One method of selecting the different colors uses gray-balanced patches. A gray-balanced path is one that has equal amounts of cyan, magenta and yellow ink which results in a neutral color. Once a color is selected, the composition of inks used to create the color can be determined.

Using traditional ink selection techniques, a printer that has only three ink colors has only one composition of the three inks that will create a given color. For a printer that has CYM inks, each in-gamut color can be created using only one combination of the CYM inks. Using Neugebauer Primary area coverage vectors to select the ink components for a given color allows a printer using only three colors of ink to have multiple different combinations of the CYM inks that will create a given color.

In one implementation, the Neugebauer Primaries are all the possible combinations of a set of n inks, where each ink is a different color. Each ink within the set may be at one of k levels for a single halftone pixel. For example, K=2 for a binary (or bi-level) printer that is able to use either no ink or one drop of ink at a single pixel per ink channel. There are $k^n$ Neugebauer Primaries for each ink set.

For example, a binary printer (k=2) using only three colors (n=3) of ink (CYM) has $2^3=8$ Neugebauer Primaries. The 8 Neugebauer Primaries are: white (i.e. no ink), one drop of cyan ink, one drop of yellow ink, one drop of magenta ink, a drop of cyan and a drop of yellow ink, a drop of cyan and a drop of magenta ink, a drop of yellow and a drop of magenta ink, and a drop of all three inks. A Neugebauer Primary that uses multiple drops of ink has all the drops deposited at the same location/Halftone pixel on the page. Depositing multiple drops of ink at the same location/pixel on the page is typically known as overprinting. A printer that uses 4 ink colors (CYMK) and can deposit zero, one or two drops per color per ink channel (i.e. k=3) has $3^4$=81 Neugebauer Primaries. In some examples the drops of ink may be of different sizes or volumes. In other examples each drop of ink is the same size or volume.

A Neugebauer Primary area coverage vector is a set of Neugebauer Primaries (NP) with an area coverage proportion for each NP in the set. Each NP in the set is an ink stack for a pixel. The format for an NP ink stack is a capital letter for each drop of ink in the ink stack. 'W' is used for a pixel with no ink (i.e. substrate white). The area coverage proportion is the percentage of pixels in a given unit area that will be printed with the NP color. The sum of the area coverage proportion for the set equals one. An example NP area coverage (NPac) vector is listed below:

NPac 1=CCK:0.057162, MM:0.186519, W:0.756319

NPac 1 is made up of three differently colored pixels. The first color has two drops of cyan ink and one drop of black ink overprinting. The first color is printed on 5.7162 percent of the pixels in a unit area. The second color has two drops of magenta ink overprinting. The second color is printed on 18.6519 percent of the pixels in the unit area. The third color is blank substrate (i.e. no ink printed on this pixel). The third color comprises 75.6319 percent of the pixels in the unit area. The sum of the area coverage's for the three colors equals 1 (or 100%). The three differently colored pixels when printed with the specified area coverage create a resultant color.

Two different NPacs that create the same resultant color are known as metamers. There are typically multiple NPacs or metamers for a given resultant color. Some metamers have bigger changes or shifts in the resultant color for a given variation in drop weight. By selecting the NPac that is most sensitive to variations in drop weight for the given resultant color, a given variation in drop weight for a printer can be more easily detected when using that NPac to create a patch on the calibration target.

Figure 6:
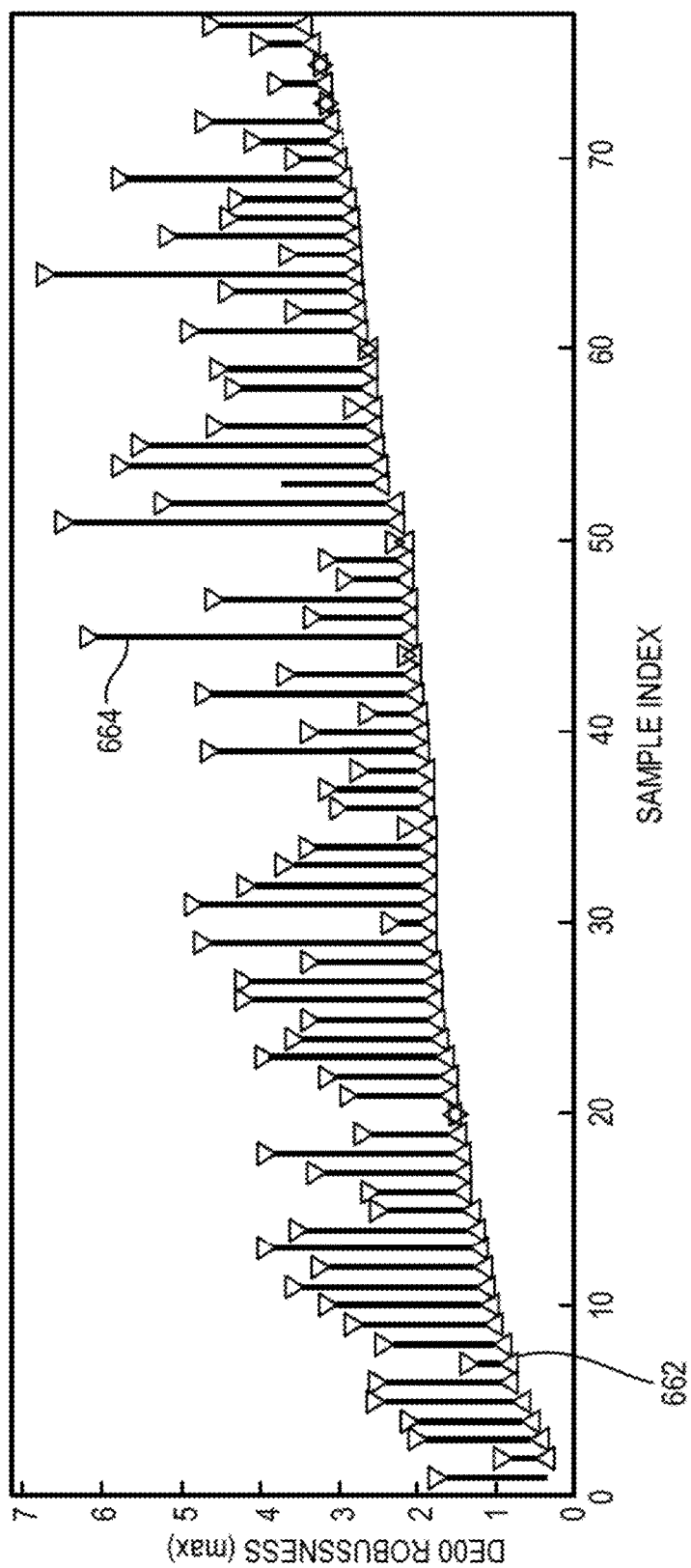
FIG. 6 is a graph of a set of example metamers for a number of different known colors.

FIG. 6 is a graph of a set of example metamers for a number of different known colors. The horizontal axis is the color sample number. The vertical axis is a measure of the color change (the CIE ΔE 2000 color difference metric) in the patch due to a constant change in the drop weight of the die used to print the patch. Each known color in the graph was created using two different NPacs. The two NPacs for each known color are connected by a vertical line. The bottom NPac is the NPac that showed the least amount of change in the resultant color of the patch for the given change in drop weight (i.e. the NPac least sensitive to drop weight changes). The top NPac is the NPac that showed the most change in the resultant color of the patch for the given change in drop weight (i.e. the NPac most sensitive to drop weight changes).

The length of the line connecting the top NPac with the bottom NPac for a given resultant color is proportional to the difference between the least sensitive NPac and the most sensitive NPac for that color. Resultant color 662 has a short line connecting the top NPac to the bottom NPac. This shows that the difference in sensitivity to drop weight variations between the two NPacs is low. Using either one of these NPac to create a color on a calibration target would result in a calibration patch that was equally sensitive to drop weight variations. Resultant color 664 has a long line connecting the top NPac to the bottom NPac. This shows that the difference in sensitivity to drop weight variations between the two NPacs is high. Using the top NPac to create a color on a calibration target would result in a calibration patch that is more sensitive to drop weight variations.

A calibration target using NPacs that are more sensitive to drop weight variations will show greater changes in color for a given change in drop weight. This allows a printer to use less sensitive sensors to detect a given changes in drop weight or have more robust readings with better signal to noise ratios. Because some colors only have NPacs that have low sensitivity to drop weight changes (like color 662) the known color may be changed to a similar color that does have an NPac with a higher sensitivity to drop weight changes. By selecting known colors that have about the same length of vertical line in FIG. 6, the sensitivity of the differently colored patches in the target will be approximately the same.

In one example, a variation in drop weight between dies of 5% can result in objectionable color changes in the printed output of a PWA printer. Therefore the calibration between dies in the printer needs to correct for changes as small as a 5% drop weight change. The printer uses a sensor that can repeatedly detect a change of one Delta E (dE) between two colors. The International Commission on Illumination (CIE) has a measure of the difference between two colors called $\Delta E^*_{ab}$ (also called $\Delta E^*$, $dE^*$, dE, or "Delta E"). The formula used to calculate dE has been updated over time. In this application when referring to color differences or dE measurements the formula published by CIE in 2000 will be assumed. Changes less than one dE are much more difficult to detect. Therefore the colors selected for the calibration target all have NPacs that result in a change in color of one dE or greater for a given change in drop weight. Listed below are 4 more example NPacs for four different resultant colors:

NPac 2=Y:0.863999, YYK:0.013672, CC:0.122329

NPac 3=W:0.051769, K:0.117175, KK:0.067286, YK:0.204654, YY:0.005938, M:0.004677, MYK:0.001737, C:0.412779, CK:0.057818, CY:0.029132, CYK:0.001470, CYYK:0.002401, CC:0.025763, CCY:0.017400

NPac 4=YY:0.072963, w:0.815201, YYK:0.111836

NPac 5=W:0.828742, MMY:0.151874, YYKK: 0.015825, MMKK:0.003558

When patches are printed using different dies that have different drop weight for the 5 example NPacs, the measured results between the dies are as follows:

NPac 1 has a dE of 1.8

NPac 2 has a dE of 1.5

NPac 3 has a dE of 1.0

NPac 4 has a dE of 1.6

NPac 5 has a dE of 1.9

Each of the changes in color for a given change in drop weight are 1 dE or larger. Therefore a calibration target printed with these NPacs and measured with the standard sensor in a printer can detect a 18% difference in drop weight between dies. The printer can then be calibrated to correct for the 18% difference in drop weight between dies.

Determining the NPac that is the most sensitive to changes in drop weight for a given known or resultant color can be done experimentally. In one example, a printer that uses two pens for each ink combination was modified to create an imbalance in drop weight between the two pens. The printer was modified by adjusting the temperature settings for each of the pair of pens differently (e.g. maximizing the temperature setting for one of the two pens and minimizing the temperature setting for the other). The temperature settings were changed on all pairs of pens such that the difference in drop weight should have been approximately the same for all the different colors of ink.

Figure 7:
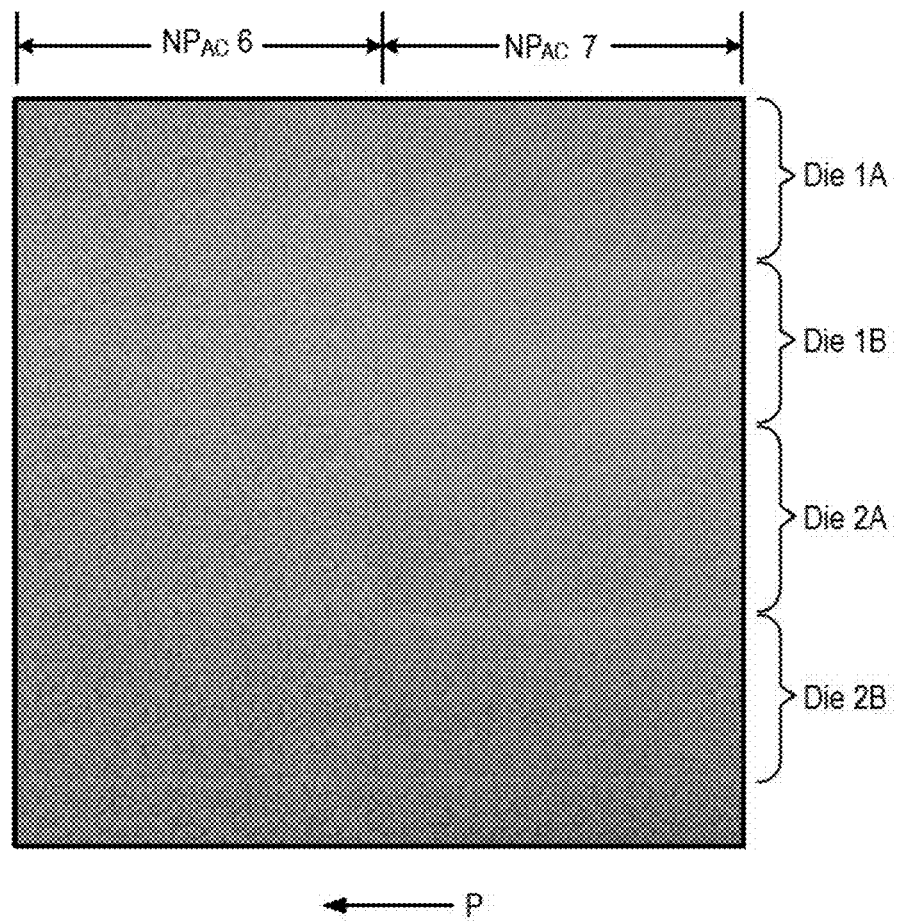
FIG. 7 is an example output of NPac 6 and NPac 7.

Typically a 1° C. of difference in pen temperature accounts for a 1% drop weight change. The difference in the temperature settings between each pair of pens was 18° C. This indicates that the drop weight difference between each pair of pens was likely between 16 and 20 percent. FIG. 7 is an example output of NPac 6 and NPac 7 listed below:

NPac 6=CMMY<1%, CCMYKK<1%, CCYKK 1%, MYY 2%, CC 2%, MKK 3%, w 91%

NPac 7=CCM 1%, CCMMYY 1%, YKK 6%, w 92%

FIG. 7 was printed using pairs of dies where the temperature setting for one of the two dies was maximized and the temperature setting for the other die was minimized. The printing direction is shown by arrow P. The left half of the image is the printed resultant color from NPac 6 and the right side of the image is the printed resultant color from NPac 7. The die locations are shown on the right side of the figure. The first pair of dies (die 1A and die 1B) are the top two dies followed by dies 2A and 2B.

In the printed resultant color from NPac 6 (left side of the image) it is difficult to see the locations or boundaries between the different dies. This indicates that NPac 6 is not sensitive to changes in drop weight. In contrast, in the printed resultant color from NPac 7 (right side of the image) locations or boundaries between the different dies can clearly be seen. This indicates that NPac 7 is sensitive to changes in drop weight.

A large set of sample NPacs for each known color was printed using the two pair of pens. Each pair of patches was measured and the difference in the two measured value was calculated. The NPac that had the largest measured color difference between the two patches printed from the pair of pens was selected as the NPac most sensitive to drop weight variations. A calibration target is created using the NPacs most sensitive to drop weight variations for each known color. This calibration target is printed as the first step in calibrating the printer.

In one example, each die in a print bar will print the calibration target. Therefore each known color in the calibration target will be printed by each die. When the printed calibration targets are measured, each known color will have a corresponding measured color for each die. The differences between the measured color values for each die, for a given known color, can be calculated. Using this difference, the color pipeline for each die can be adjusted (or calibrated) to reduce the color differences between the different dies. In one example, each end of a die will print the calibration target. The printed colors will be measured and used to calibrate each end of the die. The calibration values will be interpolated for the nozzles between the two ends of the die.

The calibration target described above is created using NPacs. The technique of determining the set of inks for a given color that is sensitive to drop weight changes is not limited to NPacs but can be used for traditional printing methods as well. Using traditional printing methods a printer that has only three ink colors has only one composition of the three inks that will create a given color. Using traditional printing methods a printer using four or more colors of ink will have multiple sets of ink combinations that produce the same known color. A traditional printing method typically specifies a color using a color vector. A color vector is the amount of each color of ink used for a given known color.

Using the experimental setup described for NPacs, the set of inks most sensitive to drop weigh changes for a traditional printing method can also be determined. The difference between using color vectors or NPacs is that the search space for NPacs is greater than for color vectors. For example, you need at least 4 ink colors when using color vectors while three ink colors are all that is needed when using NPacs.

A known color in a calibration chart can be described as a proportional coverage of primaries. The primaries are the different ink colors when in color space. The primaries are NPacs when using halftone area Neugebauer separation (HANS). For example, the proportional coverage of primaries in color space for a known color would be C %, Y %, M %, K % for a four ink color system. Where C %, Y %, M %, K % is the percentage of the different inks used for the given color. The proportional coverage of primaries for a known color when using HANS is an NPac, for example NPac 1. A proportional coverage of primaries for a given resultant color that changes color more than other proportional coverage of primaries for the same resultant color, for a given change in drop weight, is defined as being sensitive to drop weight changes.

The printer described above is a page wide array (PWA) printer. This invention is not limited to PWA printers. Any printer that needs calibration can select a proportional coverage of primaries for a known color that is sensitive to drop weight changes. This can increase the signal to noise ratio of the patches in a calibration target or can be used to allow a less sensitive sensor when measuring the color of each printed patch.

What is claimed is:

1. A printer, comprising:
   a print bar with a mount for a die;
   a processor to control the printer, the processor coupled to the mount for the die;
   a memory coupled to the processor, the memory having a calibration module loaded therein,
   the calibration module, when executed by the processor, causing the printer to print a calibration target using the die when the die is mounted on the print bar; and
   the calibration target having a patch of a known color, the known color created from a proportional coverage of primaries that is sensitive to drop weight changes based on weight drop variations that show greater changes in color for a given change in drop weight.

2. The printer of claim 1, wherein the proportional coverage of primaries is an NPac selected from a plurality of NPacs that result in the same known color.

3. The printer of claim 1, wherein the proportional coverage of primaries is a color vector selected from a plurality of color vectors that result in the same known color.

4. The printer of claim 1, where the proportional coverage of primaries will have a color change of at least one dE for a given change in drop weight.

5. The printer of claim 4, where the given change in drop weight is between 1% and 20%.

6. The printer of claim 1, wherein the printer uses only three colors of ink.

7. The printer of claim 1, further comprising:
   a mount for a plurality of dies on the print bar; and where each of the plurality of dies, when mounted on the print bar, prints the calibration target.

8. The printer of claim 1, wherein the die has a first end and a second end opposite the first end, and where the calibration target is printed at both the first end and the second end of the die.

9. A non-transitory computer readable medium comprising a calibration module, that when executed by a processor, prints a calibration target, comprising:
   a plurality of known colors where each of the plurality of known colors is created from a proportional coverage of primaries that is sensitive to drop weight changes based on drop weight variations that show greater changes in color for a given change in drop weight.

10. The non-transitory computer readable medium of claim 9, where each of the proportional coverage of primaries will have a color change of at least one dE for a given change in drop weight.

11. The non-transitory computer readable medium of claim 9, where given change in drop weight is between 1% and 20%.

12. The non-transitory computer readable medium of claim 9, where each of the proportional coverage of primaries is an NPac.

13. The non-transitory computer readable medium of claim 9, where the calibration target is printed by each die in a printer.

14. The non-transitory computer readable medium of claim 9, where the calibration target is printed by each end of each die in a printer.

15. A method for printing a calibration target, comprising:
   printing a plurality of known colors with each die in a printer where each of the plurality of known colors is created from a proportional coverage of primaries that is sensitive to drop weight changes based on drop weight variations that show greater changes in color for a given change in drop weight.

16. The method of claim 15, further comprising selecting known colors that have substantially the same sensitivity to drop weight changes.

17. The method of claim 15, further comprising calibrating the printer to correct for a difference in drop weights between each die.

18. The method of claim 17 wherein each die has a set of nozzles between two ends of the die and further comprising interpolating color pipeline calibration values for the set of nozzles between the two ends of a respective die.

19. The printer of claim 8 wherein the calibration module further causes the printer to interpolate color pipeline calibration values for a set of nozzles between the first end and the second end of the die.

20. The non-transitory computer readable medium of claim 14 wherein the calibration module when further executed by the processor, interpolates color pipeline calibration values for a set of nozzles between each end of each die in the printer.

* * * * *